(12) United States Patent
Liu

(10) Patent No.: US 11,922,673 B2
(45) Date of Patent: Mar. 5, 2024

(54) PRODUCT INSPECTION METHOD AND DEVICE, PRODUCING SYSTEM AND COMPUTER STORAGE MEDIUM

(71) Applicant: BOE Technology Group Co., Ltd., Beijing (CN)

(72) Inventor: Tong Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 353 days.

(21) Appl. No.: 17/354,189

(22) Filed: Jun. 22, 2021

(65) Prior Publication Data
US 2022/0020138 A1  Jan. 20, 2022

(30) Foreign Application Priority Data
Jul. 17, 2020 (CN) .......................... 202010698910.7

(51) Int. Cl.
| | | |
|---|---|---|
| G06V 10/75 | (2022.01) | |
| G05B 19/418 | (2006.01) | |
| G06F 18/22 | (2023.01) | |
| G06F 18/24 | (2023.01) | |
| G06T 7/00 | (2017.01) | |
| G06T 7/11 | (2017.01) | |
| G06T 7/12 | (2017.01) | |
| G06T 7/136 | (2017.01) | |

(Continued)

(52) U.S. Cl.
CPC ..... G06V 10/757 (2022.01); G05B 19/41875 (2013.01); G06F 18/22 (2023.01); G06F 18/24 (2023.01); G06T 7/001 (2013.01); G06T 7/11 (2017.01); G06T 7/12 (2017.01); G06T 7/136 (2017.01); G06T 7/337 (2017.01); G06T 7/90 (2017.01); G05B 2219/32368 (2013.01); G06V 2201/06 (2022.01)

(58) Field of Classification Search
CPC ...... G06V 10/757; G06V 10/44; G06V 10/56; G06V 2201/06; G05B 19/41875; G05B 2219/32368; G05B 2219/32201; G06F 18/22; G06F 18/24; G06T 7/001; G06T 7/11; G06T 7/12; G06T 7/136; G06T 7/337; G06T 7/90; G06T 7/13; G06T 7/33; G06T 2207/20081; G06T 2207/30164; G06T 2207/10004; Y02P 90/02; Y02P 90/80

See application file for complete search history.

(56) References Cited

U.S. PATENT DOCUMENTS

| | | | | |
|---|---|---|---|---|
| 2013/0258063 | A1* | 10/2013 | Lee ................. | H04N 7/181 348/47 |
| 2018/0314867 | A1* | 11/2018 | Kotula ............. | G06K 7/1413 |
| 2019/0172190 | A1* | 6/2019 | Liu ................... | G01N 21/956 |

(Continued)

*Primary Examiner* — John B Strege
(74) *Attorney, Agent, or Firm* — WHDA, LLP

(57) ABSTRACT

Disclosed are a product inspection method and device, producing system and a computer storage medium. The method comprises: conducting image acquisition on a product assembly line to obtain a production line image; extracting a product image including a product to be inspected from the production line image; extracting an inspection point image in a part inspection area in the product image; inputting the inspection point image into an inspection model to obtain an inspection result; and determining that the product to be inspected in the product image has defects under the condition that the inspection result meets any of the following conditions.

17 Claims, 8 Drawing Sheets

(51) Int. Cl.
   *G06T 7/33*   (2017.01)
   *G06T 7/90*   (2017.01)

(56) References Cited

U.S. PATENT DOCUMENTS

| | | | |
|---|---|---|---|
| 2019/0251385 A1* | 8/2019 | Kotula | G06K 7/10861 |
| 2019/0362486 A1* | 11/2019 | Diao | G06T 7/0004 |
| 2020/0294222 A1* | 9/2020 | Wen | G06T 7/11 |
| 2020/0356798 A1* | 11/2020 | Kotula | G06K 7/10722 |
| 2021/0121922 A1* | 4/2021 | Schmidt | G06V 10/145 |

* cited by examiner

PRODUCT INSPECTION METHOD AND DEVICE, PRODUCING SYSTEM AND COMPUTER STORAGE MEDIUM

CROSS REFERENCE TO RELEVANT APPLICATIONS

The application claims priority to Chinese Patent Application No. 202010698910.7 filed in the China National Intellectual Property Administration on Jul. 17, 2020, and a title of "Product Inspection Method, Device and System and Computer Storage Medium", the entire contents of which are hereby incorporated by reference.

TECHNICAL FIELD

The disclosure relates to the technical field of data processing, in particular to a product inspection method, device and system and a computer storage medium.

BACKGROUND

The product assembly line is a continuous production line connected by some part handling equipment. There are many workstations on the production line, and various parts on a manual or automatic mechanical conveyor belt are assembled in turn to form corresponding products.

SUMMARY

The embodiments of the disclosure provide a product inspection method, device and system and a computer storage medium.

The embodiments of the disclosure use the following technical solutions:

In an aspect, a product inspection method is provided, comprising:
  conducting image acquisition on a product assembly line to obtain a production line image;
  extracting a product image including a product to be inspected from the production line image;
  extracting an inspection point image in a part inspection area in the product image;
  inputting the inspection point image into an inspection model to obtain an inspection result; and
  determining that the product to be inspected in the product image has defects under the condition that the inspection result meets any of the following conditions:
  the inspection type of the inspection point image in the inspection result is a defect type;
  the edge box position of the inspection point image in the inspection result exceeds the first edge box position range or the edge box position of the inspection point image does not exist; and
  the feature similarity between the inspection point image in the inspection result and a reference part image is smaller than a similarity threshold.

Optionally, inputting the inspection point image into the inspection model to obtain the inspection result comprises:
  determining the target type of an inspection model corresponding to the part inspection area; and
  inputting the inspection point image into the inspection model of the target type to obtain an inspection result;
  wherein the target type of the inspection model may be any one of classifier type, segmenter type and image template type.

Optionally, on the condition that the inspection model is of the classifier type, inputting the inspection point image into the inspection model of the target type to obtain the inspection result comprises:
  extracting a first image feature from the inspection point image;
  inputting the first image feature into the inspection model of the classifier type to obtain the confidence degrees on the condition that the first image feature adopts each inspection type; and
  taking the inspection type with the highest confidence degree as the inspection type of the inspection point image, wherein the inspection type of the inspection point image at least includes a quality type or a defect type.

Optionally, on the condition that the inspection model is of the segmenter type, inputting the inspection point image into the inspection model of the target type to obtain the inspection result comprises:
  extracting a second image feature from the inspection point image;
  inputting the second image feature into the inspection model of the segmenter type to obtain an edge feature point where the second image feature meets a color threshold; and
  taking the position of the edge feature point as the edge box position of the inspection point image.

Optionally, on the condition that the inspection model is of the image template type, inputting the inspection point image into the inspection model of the target type to obtain the inspection result comprises:
  extracting a third image feature from the inspection point image and extracting a reference image feature from a reference part image; and
  conducting similarity matching on the third image feature and the reference image feature to obtain the feature similarity between the inspection point image and the reference part image.

Optionally, extracting the product image including the product to be inspected from the production line image comprises:
  conducting edge inspection on the production line image to obtain an edge box position of the product to be inspected in the production line image; and
  taking the production line image with the edge box position of the product to be inspected within a second edge box position range as the product image.

Optionally, extracting the product image including the product to be inspected from the production line image comprises:
  conducting color segmentation on the production line image to obtain an image proportion of a target color or target texture in the production line image; and
  taking the production line image whose image proportion of the target color or target texture is larger than an image proportion threshold as the product image.

Optionally, before extracting the inspection point image in the part inspection area in the product image, the method further comprises:
  extracting a first feature point of the product image;
  conducting similarity comparison on the first feature point and a second feature point of a reference product image to obtain matching feature points, wherein the reference product image is a product image pre-marked with qualified inspection point images and meeting the requirements of rotation and translation;

obtaining a coordinate transformation parameter according to the matching feature points; and conducting image registration on the product image according to the coordinate transformation parameter.

Optionally, before extracting the product image including the product to be inspected from the production line image, the method further comprises:

conducting brightness optimization on the production line image by a target method.

Optionally, after determine that the product to be inspected in the product image has defects, the method further comprises:

controlling the product assembly line to be suspended, and outputting alarm prompt information on defective products.

In another aspect, a product inspection device is provided, comprising:

one or more processors; and a memory for storing one or more programs, wherein on the condition that the one or more programs are executed by the one or more processors, the one or more processors implement the following operations:

conducting image acquisition on a product assembly line to obtain a production line image;

extracting a product image including a product to be inspected from the production line image;

extracting an inspection point image in a part inspection area in the product image;

inputting the inspection point image into an inspection model to obtain an inspection result; and determining that the product to be inspected in the product image has defects under the condition that the inspection result meets any of the following conditions:

the inspection type of the inspection point image in the inspection result is a defect type:

the edge box position of the inspection point image in the inspection result exceeds the first edge box position range or the edge box position of the inspection point image does not exist; and the feature similarity between the inspection point image in the inspection result and a reference part image is smaller than a similarity threshold.

Optionally, inputting the inspection point image into the inspection model to obtain the inspection result comprises:

determining the target type of an inspection model corresponding to the part inspection area; and inputting the inspection point image into the inspection model of the target type to obtain an inspection result; wherein the target type of the inspection model may be any one of classifier type, segmenter type and image template type.

Optionally, on the condition that the inspection model is of the classifier type, inputting the inspection point image into the inspection model of the target type to obtain the inspection result comprises:

extracting a first image feature from the inspection point image;

inputting the first image feature into the inspection model of the classifier type to obtain the confidence degrees on the condition that the first image feature adopts each inspection type; and taking the inspection type with the highest confidence degree as the inspection type of the inspection point image, wherein the inspection type of the inspection point image at least includes a quality type or a defect type.

Optionally, on the condition that the inspection model is of the segmenter type, inputting the inspection point image into the inspection model of the target type to obtain the inspection result comprises:

extracting a second image feature from the inspection point image;

inputting the second image feature into the inspection model of the segmenter type to obtain an edge feature point where the second image feature meets a color threshold; and taking the position of the edge feature point as the edge box position of the inspection point image.

Optionally, on the condition that the inspection model is of the image template type, inputting the inspection point image into the inspection model of the target type to obtain the inspection result comprises:

extracting a third image feature from the inspection point image and extracting a reference image feature from a reference part image; and conducting similarity matching on the third image feature and the reference image feature to obtain the feature similarity between the inspection point image and the reference part image.

In another aspect, a producing system is provided, comprising a product assembly line, a camera arranged towards the product assembly line, and an industrial personal computer, wherein the industrial personal computer is used for implementing the following operations:

conducting image acquisition on a product assembly line to obtain a production line image:

extracting a product image including a product to be inspected from the production line image;

extracting an inspection point image in a part inspection area in the product image;

inputting the inspection point image into an inspection model to obtain an inspection result; and determining that the product to be inspected in the product image has defects under the condition that the inspection result meets any of the following conditions:

the inspection type of the inspection point image in the inspection result is a defect type:

the edge box position of the inspection point image in the inspection result exceeds the first edge box position range or the edge box position of the inspection point image does not exist; and the feature similarity between the inspection point image in the inspection result and a reference part image is smaller than a similarity threshold.

Optionally, inputting the inspection point image into the inspection model to obtain the inspection result comprises:

determining the target type of an inspection model corresponding to the part inspection area; and inputting the inspection point image into the inspection model of the target type to obtain an inspection result; wherein the target type of the inspection model may be any one of classifier type, segmenter type and image template type.

Optionally, on the condition that the inspection model is of the classifier type, inputting the inspection point image into the inspection model of the target type to obtain the inspection result comprises:

extracting a first image feature from the inspection point image;

inputting the first image feature into the inspection model of the classifier type to obtain the confidence degrees on the condition that the first image feature adopts each inspection type; and taking the inspection type with the highest confidence degree as the inspection type of the inspection point image, wherein the inspection type of the inspection point image at least includes a quality type or a defect type.

In another aspect, a nonvolatile computer-readable storage medium on which computer programs are stored, wherein the computer programs, when executed by a processor, implement the product inspection method according to claim 1.

In another aspect, a computer program, comprising computer readable codes which, when run on computing equipment, cause the computing equipment to implement the product inspection method according to claim 1.

The above description is only an overview of the technical solution of this disclosure, which can be implemented according to the contents of the specification in order to understand the technical means of this disclosure more clearly, and in order to make the above and other objects, features and advantages of this disclosure more obvious and understandable, the detailed description of this disclosure will be given below.

BRIEF DESCRIPTION OF THE DRAWINGS

In order to explain the technical solution in the embodiments of the disclosure or the prior art more clearly, the drawings used in the description of the embodiments or related arts will be briefly introduced below. Obviously, the drawings in the following description are only some embodiments of the disclosure, and for those of ordinary skill in the art, other drawings can be obtained according to these drawings without paying creative labor.

DETAILED DESCRIPTION

The technical solution in the embodiments of the disclosure will be clearly and completely described below with reference to the drawings in the embodiments of the disclosure. Obviously, the described embodiments are only part of the embodiments of the disclosure, not all of the embodiments. Based on the embodiments in the disclosure, all other embodiments obtained by those of ordinary skill in the art without creative labor are within the scope of protection of the disclosure.

In order to clearly describe the technical solution of the embodiments of the disclosure, the words "first" and "second" are used to distinguish the same items or similar items with basically the same function and effect. Those skilled in the art can understand that the words "first" and "second" do not limit the number or execution order.

Figure 1:
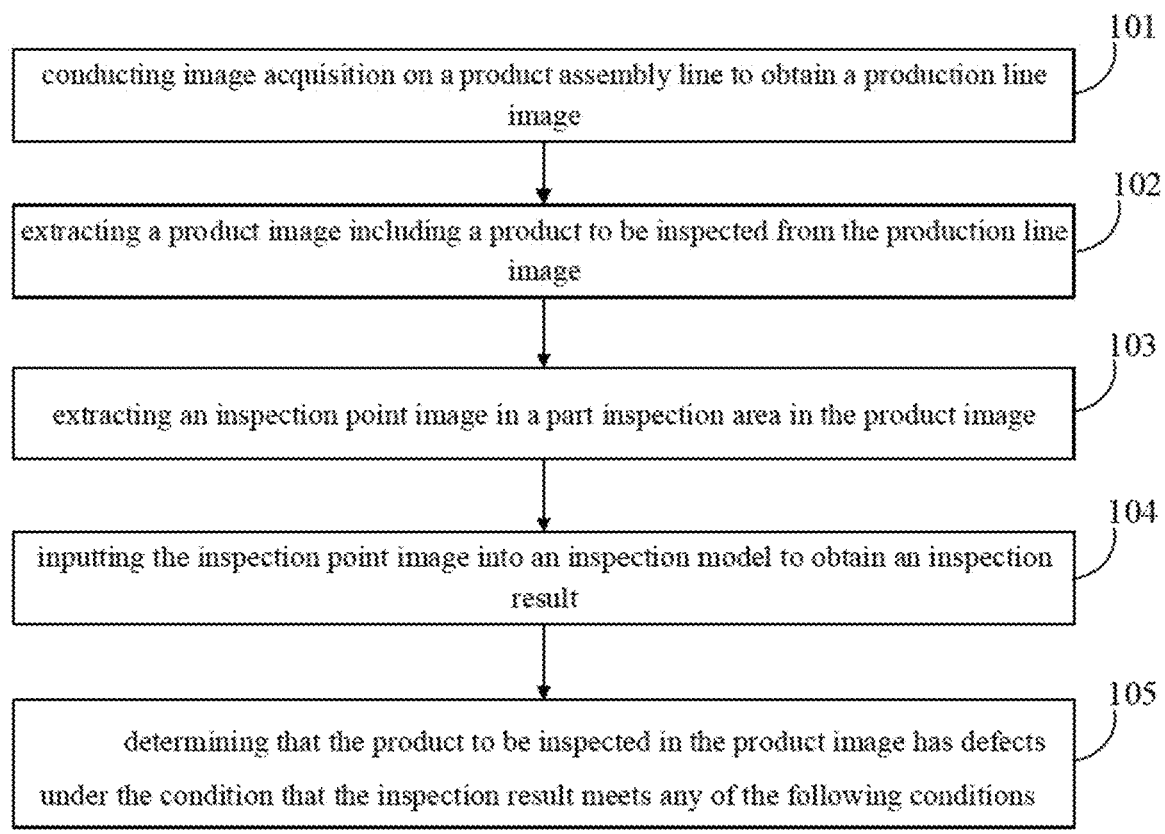
FIG. 1 is a flowchart of a product inspection method provided by an embodiment of the disclosure.

Referring to FIG. 1, an embodiment of the disclosure provides a product inspection method, which comprises:

Step 101, conducting image acquisition on a product assembly line to obtain a production line image.

In the embodiment of the disclosure, the product assembly line refers to a production line that transfers various parts of a product by a conveyor belt to workstations for assembly, so as to obtain the complete product. Each workstation can adopt manual assembly or automatic assembly. In related arts, assembled products are usually inspected by someone specially assigned on the product assembly line, which not only requires a lot of manpower, but may also lead to faulty or missed inspection caused by human factors, thus reducing the accuracy of product inspection. The production line image is an image of the conveyor belt on the product assembly line obtained by a camera arranged on the product assembly line.

According to the embodiment of the disclosure, the way of inspecting products on the product assembly line by manpower in related arts is abandoned, and the production line image obtained by image acquisition on the product assembly line is provided for subsequent product inspection. It should be noted that the shooting frequency of image acquisition on the product assembly line can be determined according to the transferring efficiency of the conveyor belt, or it can be a preset fixed shooting frequency, which can be determined according to the actual demand, and is not limited here.

Step 102, extracting a product image including a product to be inspected from the production line image.

In the embodiment of the disclosure, the product image refers to an image which displays the product to be inspected. The product to be inspected is a product which is obtained by assembling various parts on the product assembly line and has not been inspected yet.

On the product assembly line, products can be transferred on the conveyor belt at intervals, that is, there is certain space between the products on the conveyor belt. Therefore, the production line image obtained by shooting the product assembly line does not necessarily contain the product, or only contains part of the product. Before product inspection, it is necessary to extract the product image including the product to be inspected from the production line image, so as to avoid the inspection of production line images without the product to be inspected, which may affect the product inspection effect.

Step 103, extracting an inspection point image in a part inspection area in the product image.

In the embodiment of the disclosure, the part inspection area refers to an image display area where a part to be inspected is located in the product image, and the part inspection area is preset by a user according to the actual inspection requirements of the product to be inspected. The inspection point image refers to an image located in the part inspection area in the product image.

It should be noted that the inspection point image can be part of the product image or the whole product image, which can be determined according to the size of the part to be inspected in the product image, that is to say, if the part to be inspected occupies most of the image content of the product image, the inspection point image can be the whole product image, but if the part to be detected only occupies a small part of the image content of the product image, then the inspection point image can be part of the product image. Of course, the sizes of the inspection point image and the product image can be set according to the actual demand based on the realizability of this solution, and are not limited here.

Step 104, inputting the inspection point image into an inspection model to obtain an inspection result.

In the embodiment of the disclosure, the inspection model is a model for inspecting the part to be inspected in the inspection point image, and the inspection model can be a machine learning model or a data model. It can be understood that whether the part to be inspected in the product to be inspected is assembled properly can be judged by the inspection point image of the part to be inspected. For example, if a screw is missing, the image of the screw does not exist in the inspection point image; or on the condition that a plug is inserted in a wrong position, the position of the plug in the inspection point image is obviously not in a proper position. Manual product inspection in related arts is also achieved by distinguishing the styles of inspection points in the product. Therefore, by replacing manual inspection with the inspection model in this embodiment of the disclosure, the manpower required for product inspection can be reduced, and the situation that the accuracy of product inspection is affected by human factors can be avoided.

Different inspection models result in different inspection results. For example, the machine learning model based on deep learning can predict the inspection result of the product to be inspected that is, judge whether the product to be inspected has defects; however, the inspection results obtained by the data model may simply be index parameters such as brightness, chroma and contrast of the inspection point image, and further analysis is needed to judge whether the product to be inspected in the inspection point image has defects. Of course, the inspection model can be determined according to the actual demand, as long as it can judge whether there are defects in the part to be inspected in the inspection point image, which is not limited here.

Step 105, determining that the product to be inspected in the product image has defects under the condition that the inspection result meets any of the following conditions:

the inspection type of the inspection point image in the inspection result is a defect type;

an edge box position of the inspection point image in the inspection result exceeds a first edge box position range, or the edge box position of the inspection point image does not exist; and the feature similarity between the inspection point image in the inspection result and a reference part image is smaller than a similarity threshold.

In the embodiment of the disclosure, the inspection type of the inspection point image is the type of the inspection point image predicted by the inspection model, and the defect type is the type of the defect of the product to be inspected in the inspection point image. It can be understood that if the inspection point image is identified as a defect type by the inspection model, it can be determined that the product to be inspected in the inspection point image has defects.

The edge box position of the inspection point image is the position of an edge box of the product to be inspected extracted from the inspection point image by the inspection model. The first edge box position range is the position range of the edge box on the condition that the product to be inspected in the inspection point image is a qualified product. It can be understood that if the edge box position of the target inspection part in the product to be inspected in the inspection point image exceeds the first edge box position range, it can be concluded that the assembly position of the target inspection part in the product to be inspected is wrong, or the edge box position of the target inspection part in the product to be inspected is not detected, so it can be concluded that the target inspection part has not been assembled, so the product to be inspected has defects.

The feature similarity between the inspection point image and the reference part image refers to the similarity of image features of the inspection point image and the reference part image. The similarity threshold is the minimum feature similarity between the inspection point image and the reference part image for the product to be inspected in the inspection point image to be qualified. It can be understood that if the feature similarity between the inspection point image and the reference part image is too low, it is indicated that the product to be inspected in the inspection point image is quite different from the qualified product, and it can be determined that the product to be inspected in the inspection point image has defects.

Further, if the inspection result is the number of non-qualified parts among a plurality of parts to be inspected, on the condition that the number of non-qualified parts is higher than a first preset number threshold, it can be determined that the product to be inspected in the inspection point image has defects. Of course, the above is only exemplary description, and specific details are determined according to the actual demand, and are not limited here.

According to the product inspection method provided by the embodiment of the disclosure, the product image including the product to be inspected is extracted from the production line image obtained by shooting the product assembly line, and the inspection point image of the part to be inspected is extracted from the product image and input to the inspection model for product inspection so as to identify defective products, thereby reducing the labor cost required for product inspection on the product assembly line, avoiding faulty or missed inspection caused by human factors, and improving the accuracy of product inspection on the product assembly line.

Figure 2:
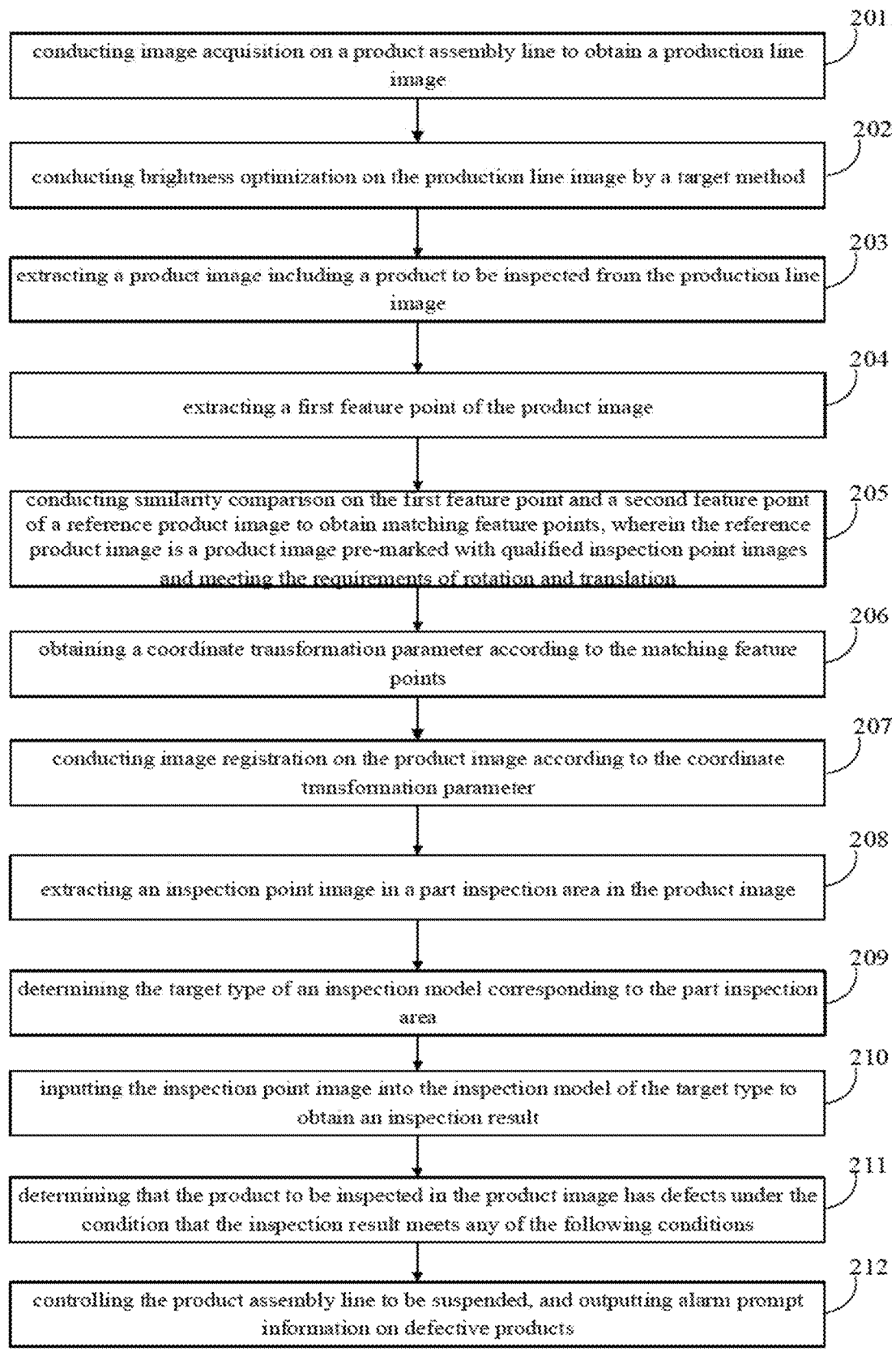
FIG. 2 is a flowchart of another product inspection method provided by an embodiment of the disclosure.

Referring to FIG. 2, an embodiment of the disclosure provides another product inspection method, which comprises:

Step 201, conducting image acquisition on a product assembly line to obtain a production line image.

This step can be implemented by referring to the detailed description of step 101, which will not be repeated here.

Step 202, conducting brightness optimization on the production line image by a target method.

The target method includes at least one of histogram equalization and gamma calibration.

In the embodiment of the disclosure, because the light in the environment where the product assembly line is located may be unevenly distributed, part of the obtained production line image is too bright or too dark, which affects the accuracy of subsequent product inspection. Therefore, it is necessary to conduct brightness optimization on the obtained production line image. Specifically, the production line image can be processed by image brightness optimization methods such as histogram equalization and gamma calibration. Both histogram equalization and gamma calibration can be implemented in the way as adopted in related arts, which will not be described in detail here. Of course, other image brightness optimization methods can also be used to process the production line image, as long as they can improve the image brightness quality of the production line image, which will not be described in detail here.

According to the embodiment of the disclosure, by conducting brightness optimization on the obtained production line image, low image quality of the production line image due to uneven light distribution in the environment where the product assembly line is located is avoided.

Step 203, extracting a product image including a product to be inspected from the production line image.

This step can be implemented by referring to the detailed description of step 102, which will not be repeated here.

Figure 3:
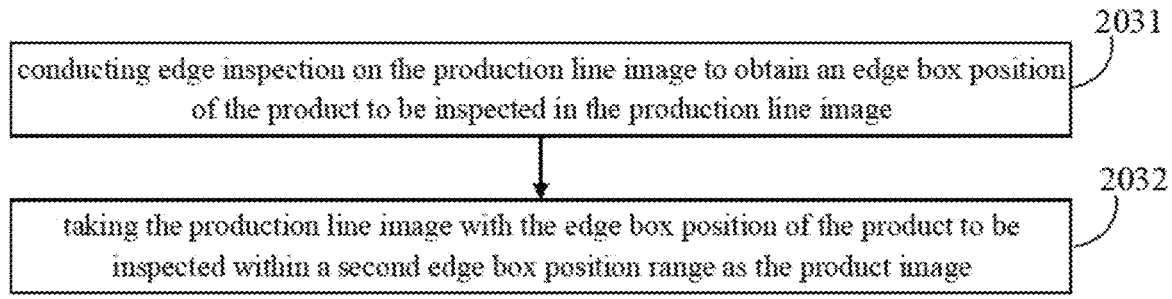
FIG. 3 is a flowchart of a product image extraction method provided by an embodiment of the disclosure.

Optionally, referring to FIG. 3, Step 203 may comprise:

Sub-step 2031, conducting edge inspection on the production line image to obtain an edge box position of the product to be inspected in the production line image.

In the embodiment of the disclosure, edge inspection is a conventional technique for inspecting a pixel set with sharp changes in pixel gray scale in an image. Because there is obvious difference between the gray scale of the conveyor belt on the product assembly line and the gray scale of the product, the position of the pixel set whose gray scale changes sharply in the production line is obtained by edge inspection of the production line image, that is, an edge box position of the product to be inspected in the production line image.

Sub-step 2032, taking the production line image with the edge box position of the product to be inspected within a second edge box position range as the product image.

In the embodiment of the disclosure, the second edge box position range refers to the edge box range where the edge box position of the product to be inspected needs to be located in the product image. It can be understood that in order to include a part to be inspected in the product to be inspected in the product image for subsequent inspection, it is necessary to ensure that the edge box position of the product to be inspected in the product image is within a certain range, that is, if the edge box position of the product to be inspected is within the second edge box position range, it can be determined that the production line image includes the part to be inspected of the product to be inspected. The second edge box position range can be specifically determined in advance according to the actual demand of product inspection, as long as it is ensured that the obtained product image includes the part to be inspected of the product to be inspected, which is not limited here.

According to the embodiment of the disclosure, the product image including the product to be inspected is extracted from the production line image based on edge inspection, so that the validity of the product image for product inspection is ensured.

Figure 4:
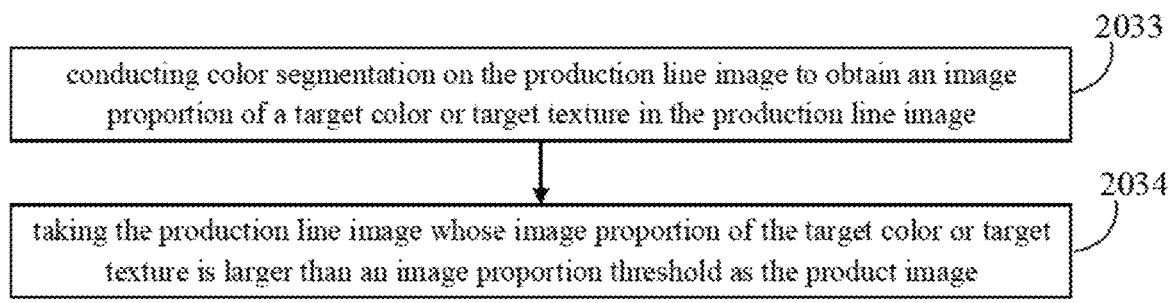
FIG. 4 is a flowchart of another product image extraction method provided by an embodiment of the disclosure.

Optionally, referring to FIG. 4, Step 203 may comprise:

Sub-step 2033, conducting color segmentation on the production line image to obtain an image proportion of a target color or target texture in the production line image.

In the embodiment of the disclosure, color segmentation refers to an algorithm for segmenting an image with a specific color or texture based on a color threshold, the color threshold is determined in advance according to the target color or target texture of the product to be inspected in the product images, and the target color and target texture are the color and texture of the product to be inspected.

Through color segmentation of the production lime image, target pixels of the target color or target texture in the production line image are obtained, and the ratio of the number of the target pixels to the total number of pixels in the production line image is taken as the image proportion of the target color or target texture in the production line image.

Sub-step 2034, taking the production line image whose image proportion of the target color or target texture is larger than an image proportion threshold as the product image.

In the embodiment of the disclosure, the image proportion threshold refers to an image proportion that the pixels of the target color or target texture in the product image need to achieve. Considering that an image of the target color or target texture in the product image should not be too small, the proportion threshold should be at least greater than 50%, such as 60% and 70%, so as to ensure the product to be inspected in the obtained product image. The proportion threshold can also be set according to the actual demand of product inspection, which is not limited here. If the image proportion of the target color or target texture in the production line image is larger than the image proportion threshold, the production line image can be taken as the product image for subsequent image inspection.

According to the embodiment of the disclosure, the product image including the product to be inspected is extracted from the production line image based on color segmentation, so that the validity of the product image for product inspection is ensured.

It should be noted that extracting the product image by color segmentation has a better effect on products with obvious color or texture, such as circuit boards which are green in whole, and for products with no obvious color or texture, edge segmentation as described in Steps 2031 to 2032 is more suitable.

Step 204, extracting a first feature point of the product image.

In the embodiment of the disclosure, the first feature point refers to an image feature point in the product image, which can be obtained based on feature extraction algorithms such as Local Binary Pattern (LBP). Histogram of Oriented Gradient (HOG). Scale Invariant Feature Transform (SIFT), etc.

Step 205, conducting similarity comparison on the first feature point and a second feature point of a reference product image to obtain matching feature points, wherein the reference product image is a product image pre-marked with qualified inspection point images and meeting the requirements of rotation and translation.

In the embodiment of the disclosure, the reference product image is a pre-selected product image with good image quality, small rotation and translation, and qualified part assembly for each inspection point in the image, and the reference product image is marked with the inspection point images where each part to be inspected is located. The second feature point refers to an image feature point in the reference product image, and the extraction method of the second feature point is similar to that of the first feature point. For details, please refer to the description of the extraction method of the first feature point in step 204. Further, on the condition that selecting the reference product image, the rotation and translation parameters of the reference product image can be obtained by using the Random Sample Consensus (RANSAC) algorithm.

Through similarity comparison of the first feature point and the second feature point, the first feature point and the second feature point with high similarity are taken as the matching feature points.

Step 206, obtaining a coordinate transformation parameter according to the matching feature points.

In the embodiment of the disclosure, the coordinate transformation parameter is a transformation parameter for transforming the first feature point to the second feature point.

Step 207, conducting image registration on the product image according to the coordinate transformation parameter.

In the embodiment of the disclosure, coordinate transformation is conducted on each pixel in the product image based on the coordinate transformation parameter, so that the product image is registered to make the product image aligned with each product inspection area in the reference product image.

According to the embodiment of the disclosure, the obtained product image is registered based on the reference product image, so that the positions of the product inspection areas in the product image are normalized, thereby reducing the processing amount required by subsequent product inspection and improving the efficiency of product inspection.

Step 208, extracting an inspection point image in a part inspection area in the product image.

This step can be implemented by referring to the detailed description of step 103, which will not be repeated here.

Step 209, determining the target type of an inspection model corresponding to the part inspection area.

In the embodiment of the disclosure, the target type of the inspection model refers to the types of the inspection models required by different part inspection areas. The association relationships between different part inspection areas and the target types of the inspection models are pre-configured, which can be specifically determined according to the types of parts to be inspected in the part inspection areas, or can be pre-configured by users according to their own needs. This can be specifically determined according to the actual demand, and will not be described here. The association relationships between the part inspection areas and the target types of the inspection models can be pre-stored as configuration files, and the target types of the inspection models corresponding to each part inspection area can be determined by reading the configuration files on the condition that file inspection is conducted.

Step 210, inputting the inspection point image into the inspection model of the target type to obtain an inspection result.

The target type of the inspection model may be anyone of classifier type, segmenter type and image template type.

In the embodiment of the disclosure, the inspection model of the classifier type may be a machine learning model obtained by extracting features from a sample product image including defective products and qualified products in advance and then inputting the features into a classifier to be trained for training. The inspection model of the classifier type can be realized based on classifier algorithms such as Support Vector Machine (SVM) and Random Forest algorithm, and feature extraction can be realized based on feature extraction algorithms such as LBP, HOG and SIFT.

The inspection model of the segmenter type may be a machine learning model obtained by extracting features from a sample product image including defective products and qualified products in advance and then inputting the features into a segmenter to be trained for training. The segmenter can be realized by algorithms such as color-based preset segmentation set connected domain analysis. Feature extraction is similar to that of the inspection model of the classifier type, so it will not be repeated here.

The inspection model of the image template type can be an image similarity inspection data model made in advance from sample product images of qualified products or an image similarity inspection data model made from sample product images of defective products.

According to the embodiment of the disclosure, by inputting the inspection point image into the inspection model of the target type corresponding to the part inspection area for product inspection, the mode of product inspection can be configured by configuring the association relationship between the part inspection area and the target type of the inspection model, and the flexibility of product inspection is improved.

Figure 5:
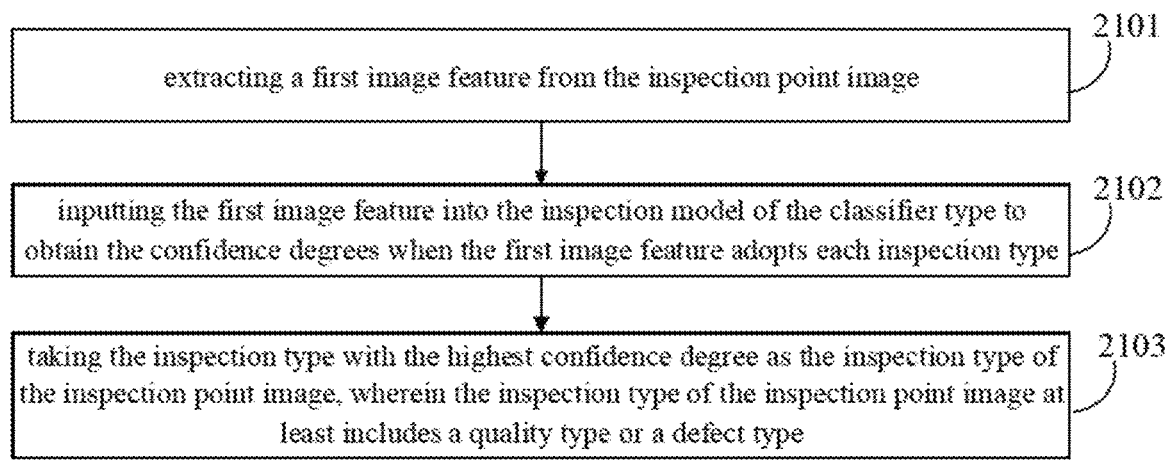
FIG. 5 is a flowchart of an inspection result acquisition method provided by an embodiment of the disclosure.

Optionally, referring to FIG. 5, on the condition that the inspection model is of the classifier type, step 210 comprises:

Sub-step 2101, extracting a first image feature from the inspection point image.

Sub-step 2102, inputting the first image feature into the inspection model of the classifier type to obtain the confidence degrees on the condition that the first image feature adopts each inspection type.

Sub-step 2103, taking the inspection type with the highest confidence degree as the inspection type of the inspection point image, wherein the inspection type of the inspection point image at least includes a quality type or a defect type.

In the embodiment of the disclosure, the first image feature can be obtained by feature extraction algorithms such as LBP, HOG, and SIFT. The inspection model of the classifier type can predict the inspection type of the part to be inspected in the inspection point image, and the inspection type may be defect type or quality type. The prediction result of the inspection model of the classifier type contains the confidence degrees on the condition that the inspection point image is of various inspection types, and the inspection type with the highest confidence degree is usually output as the inspection type of the inspection point image.

Figure 6:
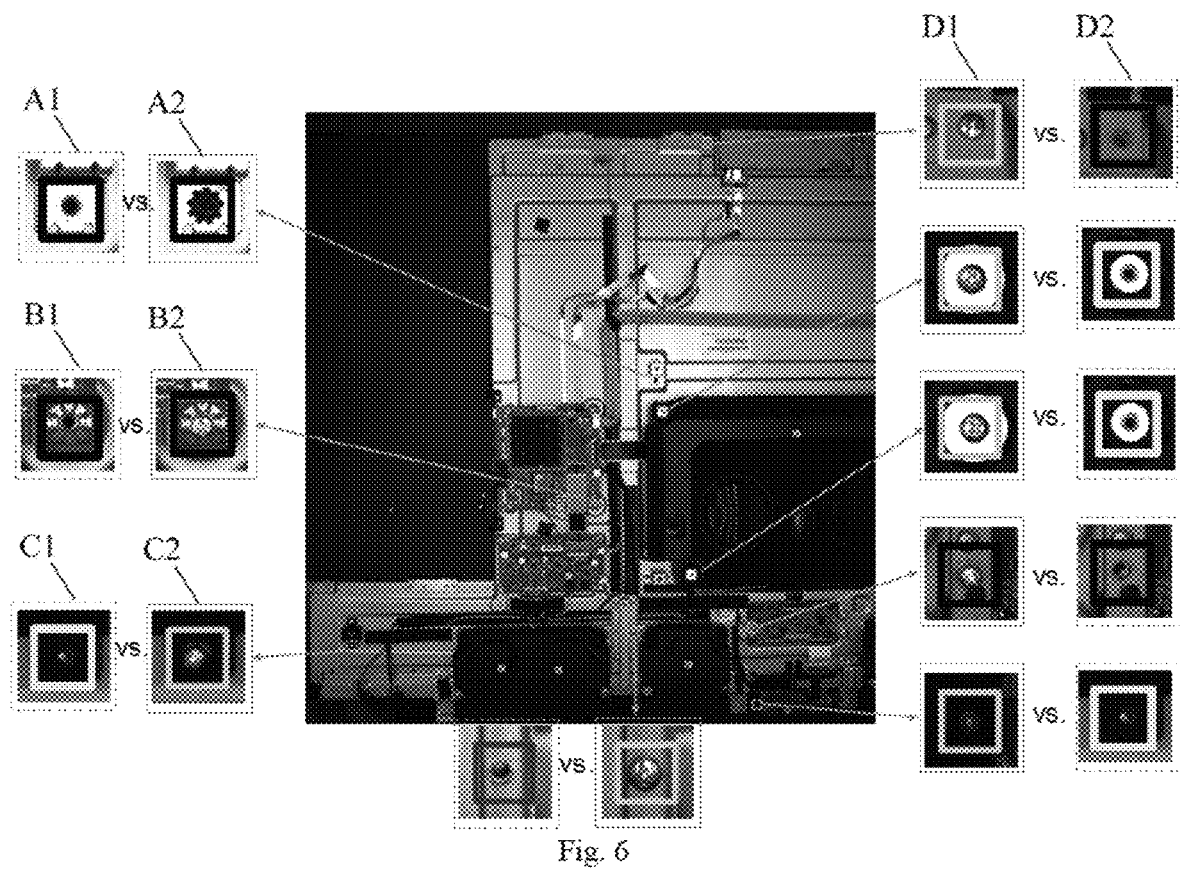
FIG. 6 is a schematic diagram of inspection results of screws provided by an embodiment of the disclosure.

In practical application, the inspection model of the classifier type can be applied to product inspection of parts with fixed shapes, such as screws and plugs. It can be understood that the inspection model of the classifier type can effectively distinguish the parts with fixed shapes because of their obvious image features. For example, referring to FIG. 6, the inspection results of different screws in an electronic product are shown.

A1, B1, C1 and D2 are detected defective screws, and A2, B2, C2 and D1 are detected qualified screws. It can be seen that the screw assembly positions in A1, B1, C1 and D2 are not equipped with corresponding screws, while the screw assembly positions in A2, B2, C2 and D1 are all properly equipped with screws. The inspection model of the classifier type can effectively conduct product inspection on parts with fixed shapes such as screws.

According to the embodiment of the disclosure, product inspection is conducted on the product image by using the inspection model of the classifier type, so that the accuracy of product inspection on parts with fixed shapes is improved.

Figure 7:
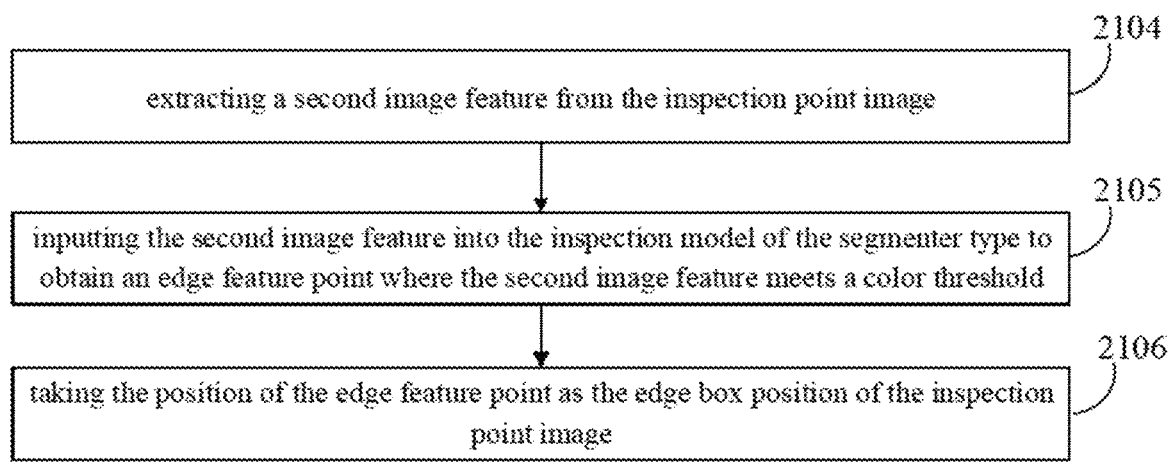
FIG. 7 is a flowchart of another inspection result acquisition method provided by an embodiment of the disclosure.

Optionally, referring to FIG. 7, on the condition that the inspection model is of the segmenter type, step 210 comprises:

Sub-step 2104, extracting a second image feature from the inspection point image.

Sub-step 2105, inputting the second image feature into the inspection model of the segmenter type to obtain an edge feature point where the second image feature meets a color threshold.

Sub-step 2106, taking the position of the edge feature point as the edge box position of the inspection point image.

In the embodiment of the disclosure, the second image feature can be obtained by feature extraction algorithms such as LBP, HOG, and SIFT. The target inspection part refers to the part to be inspected included in the inspection point image. The first edge box position range refers to the edge box range where the edge box position of the target inspection part needs to be located in the inspection point image.

Specifically, the edge feature point of the second image feature can be extracted by the following formula (1):

$$g(i, j) = \begin{cases} 1 & f(i, j) \geq T \\ 0 & f(i, j) < T \end{cases} \quad (1)$$

where g (i,j) is the coordinate value of the edge feature point, f (i, j) is the coordinate value of the second image feature, and T is the coordinate value of the first edge box position range.

The inspection model of the segmenter type can effectively extract the edge box of the target inspection part from the inspection point image based on the color threshold. The edge box of the target inspection part is compared with the first edge box position range, if it is within the first edge box position range, it can be regarded as a qualified product, and if it exceeds the first edge box position range, it can be regarded as a defective product. Of course, if there is no target inspection part in the inspection point image, for example, if adhesive tape is not applied, the edge box of the target inspection part cannot be detected, and in this case, it is determined that the product to be inspected to which the target inspection part belongs is a defective product. It can be seen that the inspection model of the segmenter type can be applied to product inspection of parts with obvious colors and unfixed shapes, such as connecting wires and adhesive tape.

Figure 8:
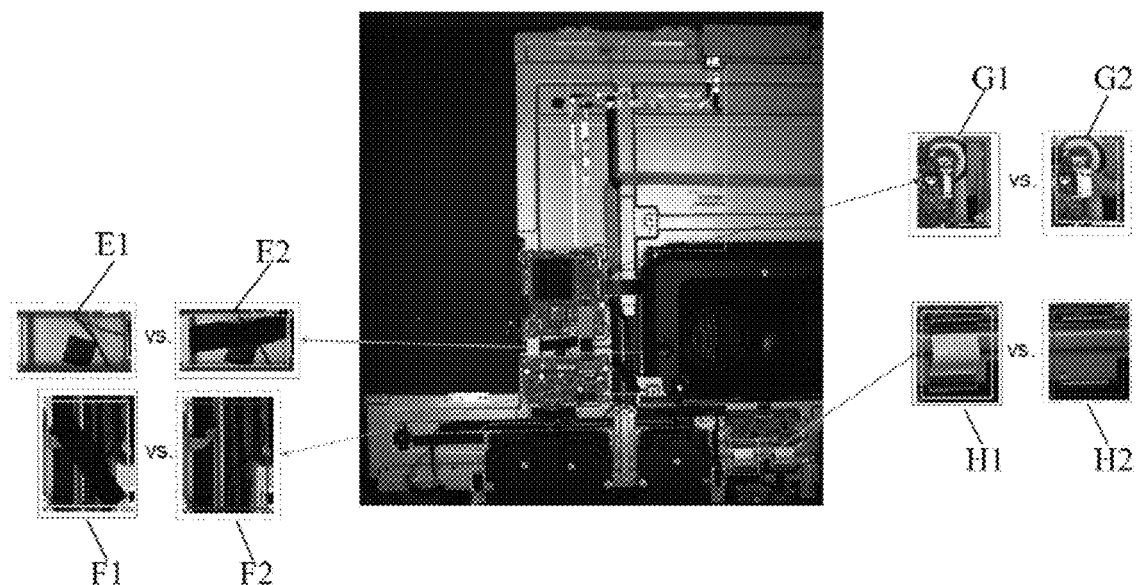
FIG. 8 is a schematic diagram of inspection results of adhesive tape and plugs provided by an embodiment of the disclosure.

For example, referring to FIG. 8, the inspection results of various kinds of tape and plugs in an electronic product are shown. E1 and F2 are detected defective tape, E2 and F1 are detected qualified tape, G1 and H2 are detected defective plugs, and G2 and H1 are detected qualified plugs. It can be seen that the shapes of the adhesive tape and plugs may be different, and the inspection model of the segmenter type can effectively inspect products such as adhesive tape and plugs, which have unfixed shapes.

According to the embodiment of the disclosure, product inspection is conducted on the product image by using the inspection model of the segmenter type, so that the accuracy of product inspection on parts with unfixed shapes is improved.

Figure 9:
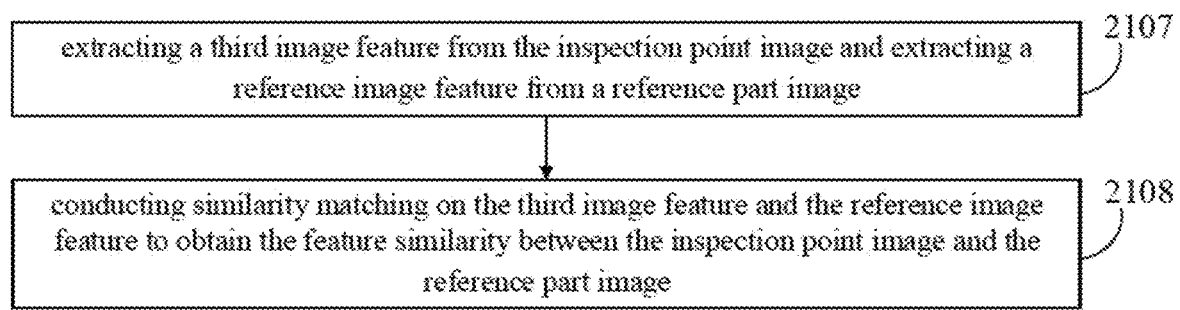
FIG. 9 is a flowchart of yet another inspection result acquisition method provided by an embodiment of the disclosure.

Optionally, referring to FIG. 9, on the condition that the inspection model is of the image template type, the step 210 comprises:

Sub-step 2107, extracting a third image feature from the inspection point image and extracting a reference image feature from a reference part image.

Sub-step 2108, conducting similarity matching on the third image feature and the reference image feature to obtain the feature similarity between the inspection point image and the reference part image.

In the embodiment of the disclosure, the third image feature may be obtained by using feature extraction algorithms based on LBP, HOG, and SIFT. The reference part image is extracted from the reference product image in advance, that is, the images of each qualified part in the reference product image. By conducting similarity comparison on the inspection point image of the product to be inspected and the reference part image of the qualified product, if the similarity is less than a similarity threshold, it is indicated that there is a big difference between the reference part image and the inspection point image, and it can be determined that the product to be inspected in the inspection point image has defects.

Specifically, the similarity between the third image feature and the reference image feature can be obtained by the following formula (2):

$$R(x, y) = \frac{\sum_{x', y'} (T'(x', y') \cdot I'(x + x', y + y'))}{\sqrt{\sum_{x', y'} T'(x', y')^2 \cdot \sum_{x', y'} I'(x + x', y + y')^2}} \quad (2)$$

where R (x, y) is the feature similarity, (x, y) is the coordinate value of the third image feature, (x', y') is the coordinate value of the reference image feature, and T' and I' are correlation coefficients.

Further, on the condition that there are a plurality of inspection point images, if the number of the inspection point images whose feature similarity with the reference part images is less than the similarity threshold is greater than a second preset number threshold, that is, on the condition that the number of non-qualified parts exceeds a certain number, it can be confirmed that the product to be inspected in the inspection point images has defects. It should be noted that different inspection point images correspond to different reference part images, because different inspection point images include different parts, and the reference part images of corresponding qualified parts are also different. For different inspection point images, the similarity thresholds can be the same or set separately, which can be determined according to the actual demand, and is not limited here.

According to the embodiment of the disclosure, product inspection is conducted on the product image by using the inspection model of the image template type, so that the accuracy of product inspection is improved.

Step 211, determining that the product to be inspected in the product image has defects under the condition that the inspection result meets any of the following conditions:

the inspection type of the inspection point image in the inspection result is a defect type;

the edge box position of the inspection point image in the inspection result exceeds the first edge box position range or the edge box position of the inspection point image does not exist;

the feature similarity between the inspection point image in the inspection result and a reference part image is smaller than a similarity threshold.

This step can be implemented by referring to the detailed description of step 105, which will not be repeated here.

Step 212, controlling the product assembly line to be suspended, and outputting alarm prompt information on defective products.

In the embodiment of the disclosure, on the condition that the product on the product assembly line is found to have defects through this solution, an industrial personal computer can control the product assembly line to stop running, and inform the staff of the product assembly line by means of ringing, flashing warning lights, voice warning, screen text warning, etc., so that the staff can conduct corresponding processing such as manual inspection and returning for maintenance on the defective product.

According to the embodiment of the disclosure, after the defective product is detected, the product assembly line is automatically stopped, and the alarm prompt information is output to inform the staff to process the defective product, so that the staff can find out the defective product in time without paying attention to the product inspection result at all times, which reduces the labor cost required for product inspection.

According to another product inspection method provided by the embodiment of the disclosure, the product image including the product to be inspected is extracted from the production line image obtained by shooting the product assembly line, and the inspection point image of the part to be inspected is extracted from the product image and input to the inspection model for product inspection so as to identify defective products, thereby reducing the labor cost required for product inspection on the product assembly line, avoiding faulty or missed inspection caused by human factors, and improving the accuracy of product inspection on the product assembly line. Further, different types of parts are detected by using the inspection models of the classifier type, the segmenter type and the image template type, which further improves the accuracy of product inspection. In addition, before processing the acquired production line image, the production line image is preprocessed by brightness optimization and registration, which not only improves the image quality, but also reduces the amount of data processing needed in the follow-up steps. In addition, after discovering defective products, the alarm prompt information is output in time to inform the staff, which further reduces the labor cost required for product inspection.

Figure 10:
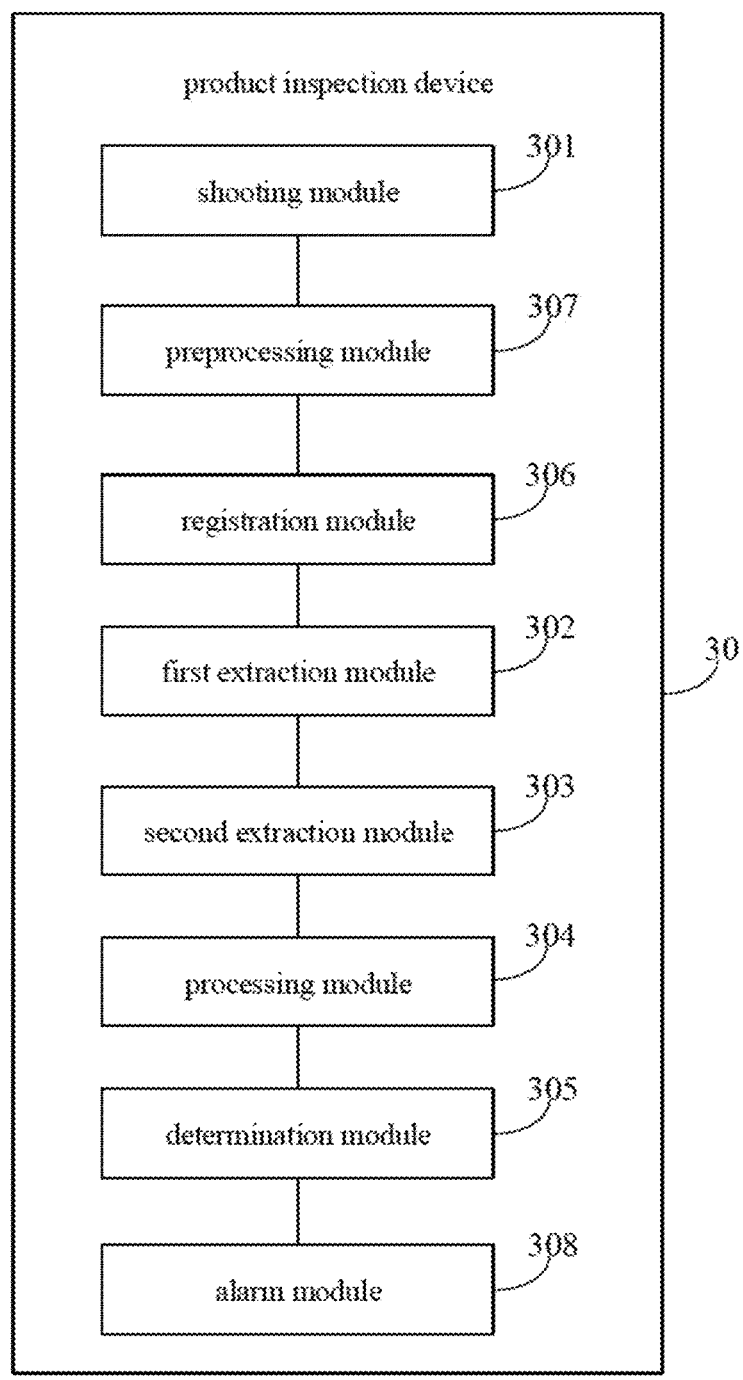
FIG. 10 is a structural block diagram of a product inspection device provided by an embodiment of the disclosure.

Referring to FIG. 10, an embodiment of the disclosure provides a product inspection device 30, which comprises:
  a shooting module 301, configured to conduct image acquisition on a product assembly line to obtain a production line image;
  a first extraction module 302, configured to extract a product image including a product to be inspected from the production line image;
  a second extraction module 303, configured to extract an inspection point image in a part inspection area in the product image;
  a processing module 304, configured to input the inspection point image into an inspection model to obtain an inspection result; and
  a determination module 305, configured to determine that the product to be inspected in the product image has defects under the condition that the inspection result meets any of the following conditions:
  the inspection type of the inspection point image in the inspection result is a defect type;
  the edge box position of the inspection point image in the inspection result exceeds the first edge box position range or the edge box position of the inspection point image does not exist; and
  the feature similarity between the inspection point image in the inspection result and a reference part image is smaller than a similarity threshold.

Optionally, the processing module 304 is further configured to:
  determine the target type of an inspection model corresponding to the part inspection area; and
  input the inspection point image into the inspection model of the target type to obtain an inspection result:
  wherein the target type of the inspection model may be any one of classifier type, segmenter type and image template type.

Optionally, on the condition that the inspection model is of the classifier type, the processing module 304 is further configured to:
  extract a first image feature from the inspection point image;
  input the first image feature into the inspection model of the classifier type to obtain the confidence degrees on the condition that the first image feature adopts each inspection type; and
  take the inspection type with the highest confidence degree as the inspection type of the inspection point image, wherein the inspection type of the inspection point image at least includes a quality type or a defect type.

Optionally, on the condition that the inspection model is of the segmenter type, the processing module 304 is further configured to:
  extract a second image feature from the inspection point image;
  input the second image feature into the inspection model of the segmenter type to obtain an edge feature point where the second image feature meets a color threshold; and
  take the position of the edge feature point as the edge box position of the inspection point image.

Optionally, on the condition that the inspection model is of the image template type, the processing module 304 is further configured to:
  extract a third image feature from the inspection point image and extracting a reference image feature from a reference part image; and
  conduct similarity matching on the third image feature and the reference image feature to obtain the feature similarity between the inspection point image and the reference part image.

Optionally, the first extraction module 30 is further configured to:
  conduct edge inspection on the production line image to obtain an edge box position of the product to be inspected in the production line image; and
  take the production line image with the edge box position of the product to be inspected within a second edge box position range as the product image.

Optionally, the first extraction module 302 is further configured to:
  conduct color segmentation on the production line image to obtain an image proportion of a target color or target texture in the production line image; and
  take the production line image whose image proportion of the target color or target texture is larger than an image proportion threshold as the product image.

Optionally, the device further comprises:
  a registration module 306, configured to:
  extracting a first feature point of the product image;
  conduct similarity comparison on the first feature point and a second feature point of a reference product image to obtain matching feature points, wherein the reference product image is a product image pre-marked with qualified inspection point images and meeting the requirements of rotation and translation:

obtain a coordinate transformation parameter according to the matching feature points; and conduct image registration on the product image according to the coordinate transformation parameter.

Optionally, the device further comprises:

a preprocessing module 307, configured to conduct brightness optimization on the production line image by a target method.

Optionally, the device further comprises:

an alarm module 308, configured to control the product assembly line to be suspended, and outputting alarm prompt information on defective products.

As the above device embodiments are basically similar to the method embodiments, the description is relatively simple, and please refer to the description of the method embodiments for relevant information.

According to the product inspection device provided by the embodiment of the disclosure, the product image including the product to be inspected is extracted from the production line image obtained by shooting the product assembly line, and the inspection point image of the part to be inspected is extracted from the product image and input to the inspection model for product inspection so as to identify defective products, thereby reducing the labor cost required for product inspection on the product assembly line, avoiding faulty or missed inspection caused by human factors, and improving the accuracy of product inspection on the product assembly line.

An embodiment of the disclosure provides a producing system, which comprises a product assembly line, a camera arranged towards the product assembly line, and an industrial personal computer, wherein the industrial personal computer is used for executing the product inspection method described in any of the above embodiments.

Figure 11:
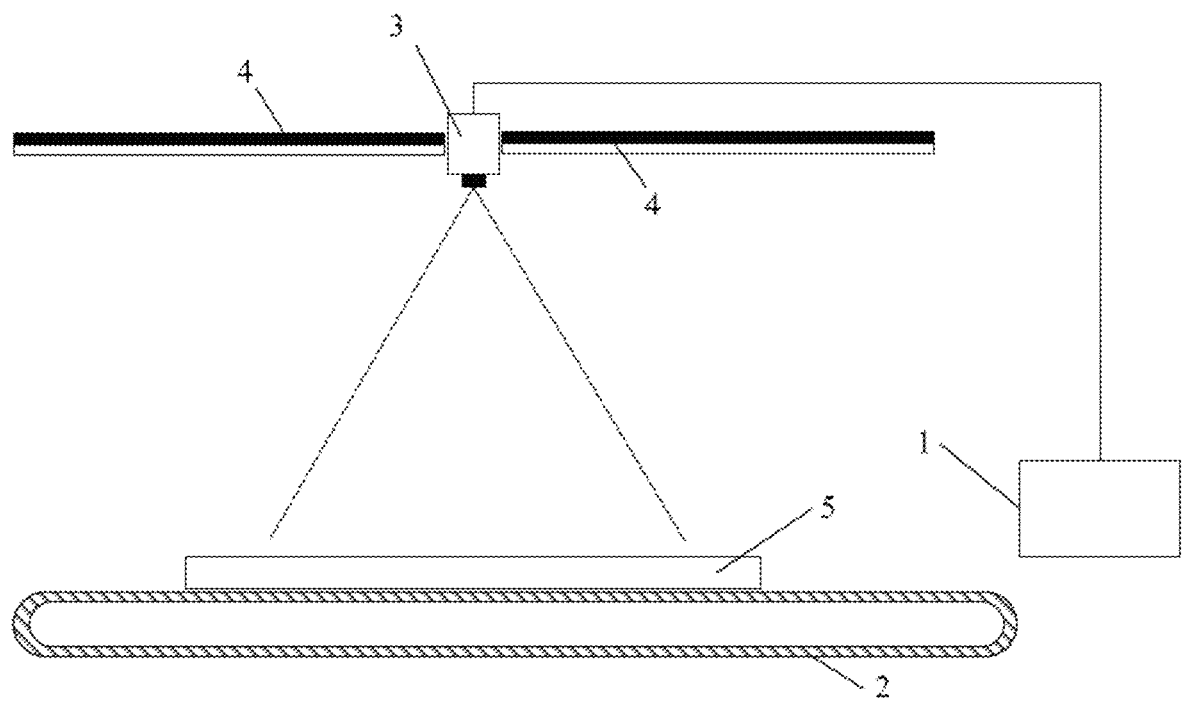
FIG. 11 is a structural diagram of a producing system provided by an embodiment of the disclosure.

Referring to FIG. 11, a structural diagram of a producing system provided by an embodiment of the disclosure is shown, in which an industrial personal computer 1 controls a camera 3 to shoot a product 5 to be inspected on a product assembly line 2 to acquire a production line image, so that the industrial personal computer 1 conducts product inspection on the product to be inspected based on the acquired production line image by executing the product inspection method described in any of the above embodiments. Further, a light source 4 may be arranged above the product assembly line 2 to illuminate the product assembly line 2, so as to ensure the quality of the line image captured by the camera 3.

According to the producing system provided by the embodiment of the disclosure, the product image including the product to be inspected is extracted from the production line image obtained by shooting the product assembly line, and the inspection point image of the part to be inspected is extracted from the product image and input to the inspection model for product inspection so as to identify defective products, thereby reducing the labor cost required for product inspection on the product assembly line, avoiding faulty or missed inspection caused by human factors, and improving the accuracy of product inspection on the product assembly line.

The device embodiments described above are only schematic, wherein the units described as separate parts may or may not be physically separated, and the parts displayed as units may or may not be physical units, i.e., may be located in one place or may be distributed over multiple network units. Some or all of the modules may be selected according to actual needs to achieve the purpose of the embodiment. One of ordinary skill in the art can understand and implement it without creative labor.

The various part embodiments of the disclosure may be implemented in hardware, or n software modules running on one or more processors, or in a combination thereof. It should be understood by those skilled in the art that a microprocessor or a digital signal processor (DSP) can be used in practice to realize some or all of the functions of some or all of the parts in the computing equipment according to embodiments of the disclosure. The disclosure can also be implemented as an equipment or apparatus program (e.g., a computer program and a computer program product) for implementing part of or the whole method described herein. Such a program implementing the disclosure may be stored on a computer readable medium, or may have the form of one or more signals. Such signals can be downloaded from the Internet, or provided on carrier signals, or in any other form.

An embodiment of the disclosure provides a computer storage medium, on which a computer program is stored, and when the computer program is executed by a processor, the product inspection method described above can be realized.

An embodiment of the disclosure provides a computer storage medium, and the above product inspection method can be realized by executing a computer program of the computer storage medium, thereby reducing the labor cost required for product inspection on the product assembly line, avoiding faulty or missed inspection caused by human factors, and improving the accuracy of product inspection on the product assembly line.

It can be understood by those skilled in the art that the disclosure comprises equipment for implementing one or more of the operations described in the disclosure. The equipment may be specially designed and manufactured for the desired purpose, or may include known equipment in general-purpose computers. The equipment has computer programs stored therein that are selectively activated or reconfigured. Such computer programs may be stored in a storage medium of the equipment (e.g., a computer) or in any type of medium suitable for storing electronic instructions and coupled to a bus, and the computer storage medium includes but is not limited to any type of disk (including floppy disk, hard disk, optical disk, CD-ROM and magneto-optical disk), Read-Only Memory (ROM), Random Access Memory (RAM), Erasable Programmable Read-Only Memory (EPROM), Electrically Erasable Programmable Read-Only Memory (EEPROM), flash memory, magnetic card or optical card. That is, the storage medium includes any medium that stores or transmits information in a readable form by the equipment (e.g., a computer).

Figure 12:
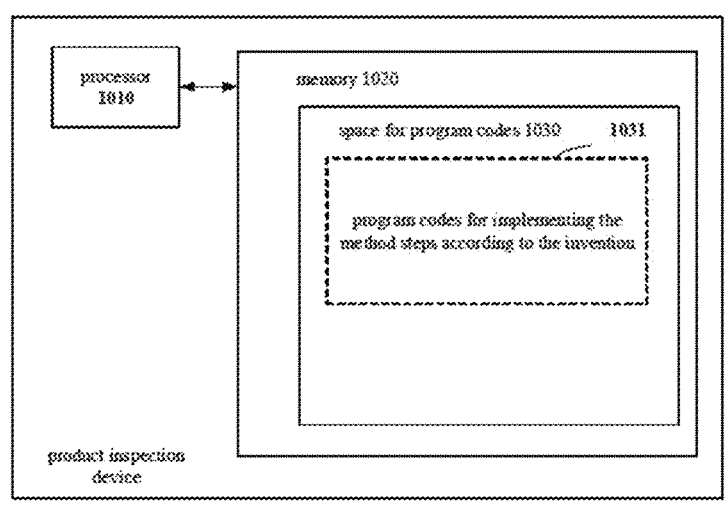
FIG. 12 schematically shows a block diagram of computing equipment for executing the method according to the disclosure.
Figure 13:
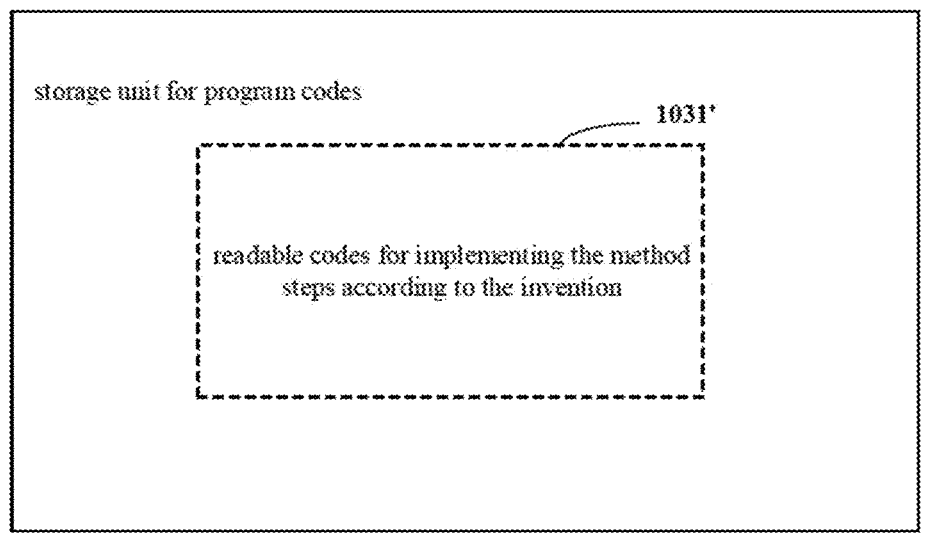
FIG. 13 schematically shows a storage unit for holding or carrying program codes for implementing the method according to the disclosure.

For example, FIG. 12 shows computing equipment that can implement the method according to the disclosure. The computing equipment conventionally comprises a processor 1010 and a computer program product or computer readable medium in the form of a memory 1020. The memory 1020 may be an electronic memory such as flash memory. Electrically Erasable Programmable Read-Only Memory (EEPROM), EPROM, hard disk or ROM. The memory 1020 has a storage space 1030 for program codes 1031 for executing any step in the above method. For example, the storage space 1030 for the program codes may include various program codes 1031 for implementing the various steps in the above method. These program codes can be read from or written into one or more computer program products. These computer program products include program code carriers such as hard disk, compact disk (CD), memory card or floppy disk. Such a computer program product is usually a portable or fixed storage unit as described with reference to FIG. 13. The memory unit may have memory segments, memory spaces, and the like arranged similarly to the memory 1020 in the computing equipment of FIG. 12. The program codes can be compressed in an appropriate form, for example. Generally, the storage unit comprises computer readable codes 1031', i.e., codes readable by, for example, a processor such as 1010, which, when run by the computing equipment, cause the computing equipment to implement the various steps in the method described above.

It can be understood by those skilled in the art that each block in these structural diagrams and/or block diagrams and/or flowcharts and combinations of blocks in these structural diagrams and/or block diagrams and/or flowcharts can be implemented by computer program instructions. It can be understood by those skilled in the art that these computer program instructions can be provided to a processor of a general-purpose computer, a professional computer or other programmable data processing methods for implementation, so that the solutions specified in the blocks of the structural diagrams and/or block diagrams and/or flowcharts of the disclosure can be executed by the processors of the computers or other programmable data processing methods.

As used herein, "one embodiment", "embodiment" or "one or more embodiments" means that a particular feature, structure or characteristic described in connection with an embodiment is included in at least one embodiment of the disclosure. In addition, please note that the word examples of "in one embodiment" here do not necessarily all refer to the same embodiment.

In the specification provided herein, numerous specific details are set forth. However, it should be understood that the embodiments of the disclosure may be practiced without these specific details. In some instances, well-known methods, structures, and techniques have not been shown in detail so as not to obscure the understanding of the specification.

In the Claims, any reference signs placed between parentheses shall not be construed as limiting the claims. The word "comprise" does not exclude the presence of elements or steps not listed in a claim. The word "a" or "an" preceding an element does not exclude the presence of a plurality of such elements. The disclosure can be realized by means of hardware comprising several different elements and by means of a suitably programmed computer. In a unit claim enumerating several means, several of these means may be embodied by one and the same item of hardware. The use of words first, second, third, etc., does not indicate any order. These words can be interpreted as names. The above are only specific embodiments of the disclosure, but the protection scope of the disclosure is not limited thereto. Anyone skilled in the art can easily think of changes or substitutions within the technical scope disclosed in the disclosure, which should be covered within the protection scope of the disclosure. Therefore, the protection scope of the disclosure shall be subject to the protection scope of the Claims.

The invention claimed is:

1. A product inspection method, comprising:
conducting image acquisition on a product assembly line to obtain a production line image;
extracting a product image including a product to be inspected from the production line image;
extracting an inspection point image in a part inspection area in the product image;
inputting the inspection point image into an inspection model to obtain an inspection result, wherein the inspection model is a machine learning model or a data model; and
determining that the product to be inspected in the product image has defects under a condition that the inspection result meets any of the following conditions:
an inspection type of the inspection point image in the inspection result is a defect type;
an edge box position of the inspection point image in the inspection result exceeds a first edge box position range or an edge box position of the inspection point image does not exist; and
a feature similarity between the inspection point image in the inspection result and a reference part image is smaller than a similarity threshold;
wherein inputting the inspection point image into the inspection model to obtain the inspection result comprises:
determining a target type of an inspection model corresponding to the part inspection area; and
inputting the inspection point image into the inspection model of the target type to obtain an inspection result;
wherein the target type of the inspection model may be any one of classifier type, segmenter type and image template type.

2. The method according to claim 1, wherein on the condition that the inspection model is of the classifier type, inputting the inspection point image into the inspection model of the target type to obtain the inspection result comprises:
extracting a first image feature from the inspection point image;
inputting the first image feature into the inspection model of the classifier type to obtain the confidence degrees on the condition that the first image feature adopts each inspection type; and
taking the inspection type with the highest confidence degree as the inspection type of the inspection point image, wherein the inspection type of the inspection point image at least includes a quality type or a defect type.

3. The method according to claim 1, wherein on the condition that the inspection model is of the segmenter type, inputting the inspection point image into the inspection model of the target type to obtain the inspection result comprises:
extracting a second image feature from the inspection point image;
inputting the second image feature into the inspection model of the segmenter type to obtain an edge feature point where the second image feature meets a color threshold; and
taking the position of the edge feature point as the edge box position of the inspection point image.

4. The method according to claim 1, wherein on the condition that the inspection model is of the image template type, inputting the inspection point image into the inspection model of the target type to obtain the inspection result comprises:
extracting a third image feature from the inspection point image and extracting a reference image feature from a reference part image; and
conducting similarity matching on the third image feature and the reference image feature to obtain the feature similarity between the inspection point image and the reference part image.

5. The method according to claim 1, wherein extracting the product image including the product to be inspected from the production line image comprises:
conducting edge inspection on the production line image to obtain an edge box position of the product to be inspected in the production line image; and
taking the production line image with the edge box position of the product to be inspected within a second edge box position range as the product image.

6. The method according to claim 1, wherein extracting the product image including the product to be inspected from the production line image comprises:
conducting color segmentation on the production line image to obtain an image proportion of a target color or target texture in the production line image; and
taking the production line image whose image proportion of the target color or target texture is larger than an image proportion threshold as the product image.

7. The method according to claim 1, wherein before extracting the inspection point image in the part inspection area in the product image, the method further comprises:
extracting a first feature point of the product image;
conducting similarity comparison on the first feature point and a second feature point of a reference product image to obtain matching feature points, wherein the reference product image is a product image pre-marked with qualified inspection point images and meeting the requirements of rotation and translation;
obtaining a coordinate transformation parameter according to the matching feature points; and
conducting image registration on the product image according to the coordinate transformation parameter.

8. The method according to claim 1, wherein before extracting the product image including the product to be inspected from the production line image, the method further comprises:
conducting brightness optimization on the production line image by a target method.

9. The method according to claim 1, wherein after determine that the product to be inspected in the product image has defects, the method further comprises:
controlling the product assembly line to be suspended, and outputting alarm prompt information on defective products.

10. A product inspection device, comprising:
one or more processors; and
a memory for storing one or more programs, wherein when the one or more programs are executed by the one or more processors, the one or more processors implement the following operations:
conducting image acquisition on a product assembly line to obtain a production line image;
extracting a product image including a product to be inspected from the production line image;
extracting an inspection point image in a part inspection area in the product image;
inputting the inspection point image into an inspection model to obtain an inspection result wherein the inspection model is a machine learning model or a data model; and
determining that the product to be inspected in the product image has defects under a condition that the inspection result meets any of the following conditions:
an inspection type of the inspection point image in the inspection result is a defect type;
an edge box position of the inspection point image in the inspection result exceeds a first edge box position range or an edge box position of the inspection point image does not exist; and
a feature similarity between the inspection point image in the inspection result and a reference part image is smaller than a similarity threshold;
wherein inputting the inspection point image into the inspection model to obtain the inspection result comprises:
determining a target type of an inspection model corresponding to the part inspection area; and
inputting the inspection point image into the inspection model of the target type to obtain an inspection result;
wherein the target type of the inspection model may be any one of classifier type, segmenter type and image template type.

11. The product inspection device according to claim 10, wherein on the condition that the inspection model is of the classifier type, inputting the inspection point image into the inspection model of the target type to obtain the inspection result comprises:
extracting a first image feature from the inspection point image;
inputting the first image feature into the inspection model of the classifier type to obtain the confidence degrees on the condition that the first image feature adopts each inspection type; and
taking the inspection type with the highest confidence degree as the inspection type of the inspection point image, wherein the inspection type of the inspection point image at least includes a quality type or a defect type.

12. The product inspection device according to claim 10, wherein on the condition that the inspection model is of the segmenter type, inputting the inspection point image into the inspection model of the target type to obtain the inspection result comprises:
extracting a second image feature from the inspection point image;
inputting the second image feature into the inspection model of the segmenter type to obtain an edge feature point where the second image feature meets a color threshold; and
taking the position of the edge feature point as the edge box position of the inspection point image.

13. The product inspection device according to claim 10, wherein on the condition that the inspection model is of the image template type, inputting the inspection point image into the inspection model of the target type to obtain the inspection result comprises:
extracting a third image feature from the inspection point image and extracting a reference image feature from a reference part image; and
conducting similarity matching on the third image feature and the reference image feature to obtain the feature similarity between the inspection point image and the reference part image.

14. A producing system, comprising a product assembly line, a camera arranged towards the product assembly line, and an industrial personal computer, wherein the industrial personal computer is used for implementing the following operations:
conducting image acquisition on a product assembly line to obtain a production line image;
extracting a product image including a product to be inspected from the production line image;

extracting an inspection point image in a part inspection area in the product image;

inputting the inspection point image into an inspection model to obtain an inspection result wherein the inspection model is a machine learning model or a data model; and determining that the product to be inspected in the product image has defects under a condition that the inspection result meets any of the following conditions:

an inspection type of the inspection point image in the inspection result is a defect type;

an edge box position of the inspection point image in the inspection result exceeds a first edge box position range or an edge box position of the inspection point image does not exist; and a feature similarity between the inspection point image in the inspection result and a reference part image is smaller than a similarity threshold;

wherein inputting the inspection point image into the inspection model to obtain the inspection result comprises:

determining a target type of an inspection model corresponding to the part inspection area; and inputting the inspection point image into the inspection model of the target type to obtain an inspection result;

wherein the target type of the inspection model may be any one of classifier type, segmenter type and image template type.

15. The producing system according to claim 14, wherein on the condition that the inspection model is of the classifier type, inputting the inspection point image into the inspection model of the target type to obtain the inspection result comprises:

extracting a first image feature from the inspection point image;

inputting the first image feature into the inspection model of the classifier type to obtain the confidence degrees on the condition that the first image feature adopts each inspection type; and taking the inspection type with the highest confidence degree as the inspection type of the inspection point image, wherein the inspection type of the inspection point image at least includes a quality type or a defect type.

16. A non-transitory computer-readable storage medium on which computer programs are stored, wherein the computer programs, when executed by a processor, implement the product inspection method according to claim 1.

17. A non-transitory computer-readable storage medium storing a computer program, wherein the computer program comprises computer readable codes which, when run on computing equipment, cause the computing equipment to implement the product inspection method according to claim 1.

\* \* \* \* \*